United States Patent [19]

Wako

[11] Patent Number: 4,476,473
[45] Date of Patent: Oct. 9, 1984

[54] ELECTROSTATIC RECORD IMAGE FORMING METHOD
[75] Inventor: Shoji Wako, Kanagawa, Japan
[73] Assignee: Fuji Xerox Co., Ltd., Tokyo, Japan
[21] Appl. No.: 342,567
[22] Filed: Jan. 25, 1982
[30] Foreign Application Priority Data
  Jan. 27, 1981 [JP] Japan ................................. 56-10644
[51] Int. Cl.³ .......................................... G01D 15/06
[52] U.S. Cl. .................................................. 346/155
[58] Field of Search ............... 346/139 R, 139 C, 155; 101/DIG. 13

[56] References Cited
U.S. PATENT DOCUMENTS
  3,611,419 10/1971 Blumenthal ...................... 346/155

Primary Examiner—Thomas H. Tarcza
Attorney, Agent, or Firm—Sughrue, Mion, Zinn, Macpeak and Seas

[57] ABSTRACT

The auxiliary electrodes in a multi-stylus electrode assembly are coated with an insulating paint to permit precharging of the recording medium.

11 Claims, 3 Drawing Figures

ELECTROSTATIC RECORD IMAGE FORMING METHOD

BACKGROUND OF THE INVENTION

This invention relates to an electrostatic recording system employed for a facsimile or a printer, and more particularly to a preliminary charging method in a printing system using a single surface control type (Gould type) multi-stylus electrode assembly.

An electrostatic recording method is known in the art in which signal voltages are applied to charging electrodes to apply electrical charges onto a recording medium, which are electrically insulated from one another and arranged in a line, to form an electrostatic latent image on a recording medium such as an electrostatic recording sheet, and the latent image, after being developed with toner power, is fixed. Japanese Patent Application Laid-Open No. 6941/1972 has disclosed a method in which, after an electrostatic recording sheet has been uniformly charged at a certain potential, discharge electrodes of the multi-stylus electrode assembly are grounded according to an image signal, so that the image corresponding to the original picture is erased from the recording medium, and the resultant image, after being developed with toner or the like, is fixed. However, since the method in which the recording sheet is discharged after being uniformly charged is disadvantageous in that the number of drivers is large and accordingly the manufacturing cost is high, and in that it is difficult to uniformly discharge the recording sheet, the above-described method in which signal voltages are applied to the charging electrodes is usually employed at present. A device for applying the desired signal voltages, as disclosed by Japanese Patent Application Publication No. 38531/1976, is commonly employed.

In such a device, auxiliary electrodes are arranged at certain intervals on a surface of a block in which multi-stylus charging electrodes are arranged in an array, and with only the auxiliary electrodes required for printing being driven, electric discharge is caused between the auxiliary electrodes and the charging electrodes by applying a necessary voltage across these electrodes. This generates electric charge so that the electric charge thus generated is held on a recording medium such as an electrostatic recording sheet. Hereinafter, the above-described electrode assembly will be referred to as "a Gould type multi-stylus electrode assembly".

If, in this case, the charging electrodes have positive polarity, then it is necessary to apply a voltage of at least $+350$ V to the charging electrodes and a voltage of at least $-350$ V to the auxiliary electrodes; that is, a voltage of at least 700 V must be developed across the charging electrodes and the auxiliary electrodes.

In the method in which positive signal voltages are applied to the charging electrodes, if the dot density of the charging electrodes is increased, electric discharge is liable to occur between the stylus charging electrodes. For instance, in the case of a dot density of 8 dots/mm, electric discharge is liable to occur between the electrodes at a potential of about $+350$ V or higher. That is a serious problem in the maintenance of the multi-stylus electrode assembly.

In developing with toner or the like a latent image formed on the recording medium in the above-described method, no true electric charge is present in the background region on the recording layer of the recording material, and therefore the toner is liable to adhere to this region, thus making the latter dirty.

SUMMARY OF THE INVENTION

An object of this invention is to decrease the applied voltage and to prevent the background region on the recording layer from being made dirty by toner in the electrostatic recording method in which an electrostatic latent image is formed on the recording medium using the Gould type multi-stylus electrode assembly.

The foregoing object of the invention has been achieved by the provision of an electrostatic record image forming method in which a Gould type multi-stylus electrode assembly whose control electrodes are covered with an insulating paint is run over an electrostatic recording medium in such a manner that the surface of the paint is in contact with the recording layer of the electrostatic recording medium, to form a latent image on the recording layer, and in which, according to the invention, the recording layer is electrically pre-charged opposite in polarity to the charging electrodes of the assembly.

BRIEF DESCRIPTION OF THE DRAWINGS

The arrangement of the invention will be described with reference to the accompanying drawings, in which.

DETAILED DESCRIPTION OF THE INVENTION

Figure 1:
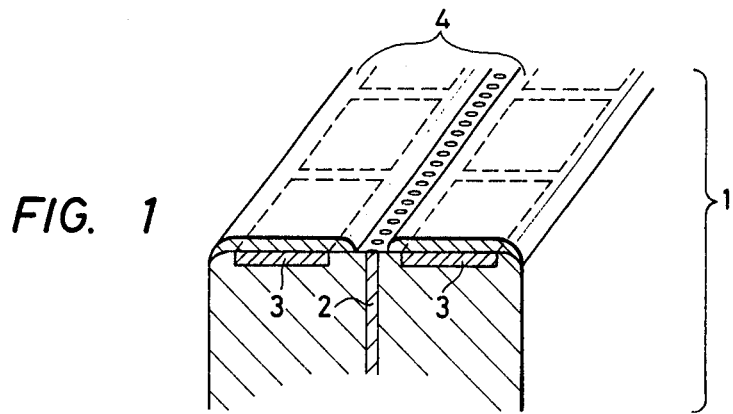
FIG. 1 is a schematic diagram showing a single surface control type multi-stylus electrode assembly employed in the technique of this invention.
Figure 2:
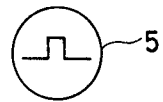
FIG. 2 is an explanatory diagram showing the positional relationships between the multi-stylus electrode assembly in FIG. 1 and a recording medium.
Figure 2:
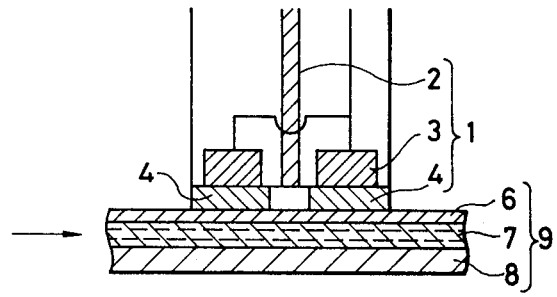

In order to decrease the inter-charging-electrode potential of a Gould type multi-stylus electrode assembly, a method may be employed in which true electric charge opposite in polarity to the charging electrodes is given in advance to the recording medium. However, the employment of this method for the ordinary Gould type multi-stylus electrode assembly is undesirable in that, because the true electric charge layer acts as a kind of electrode, ghosts are caused by portions of the charging electrodes and black stripes are formed by the contact of portions of the auxiliary electrodes. The inventor has found that preliminary charging can be achieved by providing a paint layer 4 on an auxiliary electrode 3, which paint layer serves as a gap holding and insulating member.

In a Gould type multi-stylus electrode assembly with paint layers 4 according to the invention, when a recording medium 9 in the form of three layers is run in such a manner that its recording layer 6 is confronted with the paint layer 4, a potential opposite in polarity to the application voltage of charging electrodes 2 may be given to the recording layer 6 by a corotoron 15 or a bias roll in advance. Signal voltages are applied to the recording medium thus precharged by the Gould type multi-stylus electrode assembly with the paint layers 4, to form an electrostatic latent image. After the latent image has been developed by a developer 10, for instance according to a xerographic developing method, the developed image is transferred onto an ordinary sheet by a transferring corotoron 12.

Any paint can be employed as the gap holding and insulating member of the invention, if its volumetric resistivity is $10^{10} \Omega cm$ or larger. The thickness of the film may be of the order of 2 to 20 $\mu$. The reason why the gap should be maintained at this level is that, aside from the paint's insulating characteristic, the electric charge can be smoothly started by placing the recording layer 6 apart from the charging electrodes 2 to the above-described extent.

The invention will now be described with reference to a concrete example.

A polyfluorethylene paint (for example, "Teflon" paint "Emuralon 27" manufactured by Acheson (Japan) Limited) was used as the gap holding and insulating paint. The paint was sprayed to a thickness of 10 $\mu$, on the control electrodes 3 of the signal surface control type multi-stylus electrode assembly 1 having a main electrode dot density of 8 dots/mm, to prepare the recording electrodes. Then, the recording layer 6 of the recording medium 9, which consists of a base layer 8, an intermediate resistance layer 7 and the recording layer 6, was charged to $-50$ V by the corotoron 15 as shown in FIG. 3.

Figure 3:
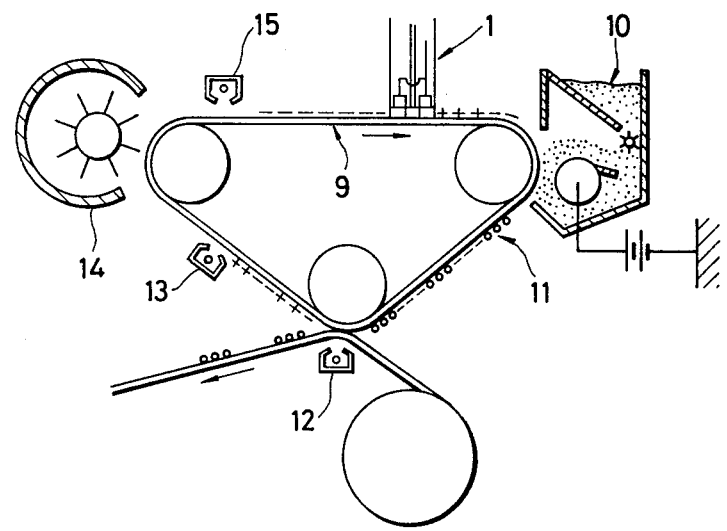
FIG. 3 is a schematic diagram showing an image forming device employing the technique of this invention.

Thereafter, as shown in FIG. 3, the multi-stylus electrode assembly 1 was set over the recording layer in such a manner that the paint surface was in contact with the recording layer surface, and while the recording medium was being run, a signal voltage of 30300 V and a control voltage of $-350$ V were applied to the charging electrodes and the auxiliary electrodes, respectively, to form an electrostatic latent image. The latent image was developed with negatively charged dry toner, and the developed image was transferred onto an ordinary sheet. As a result, a considerably fine image having a background density ID$=0.01$ was obtained.

An image formation test was carried out under the condition that the recording layer was not charged at all, i.e. it was maintained at zero potential. The resultant image was not useful, because bit drop-out occurred significantly when a voltage lower than $+350$ V was applied to the main electrodes with a voltage $-350$ V applied to the auxiliary electrodes. When the voltage of $+350$ V was applied to the main electrodes, electrical discharge occurred often between the main electrodes, as a result of which the driver was damaged by the discharge and the main electrode section was burned. Thus, the resultant image was very low in image quality. In this case, the background density was increased to about Id$=0.2$ when compared with that in the example of the invention in which the preliminary electric charging was carried out.

As is apparent from the above description, the combination of the multi-stylus electrode assembly according to the method of the invention and the method of preliminarily charging the recording medium makes it possible to form a latent image at a low voltage when compared with the conventional method. Therefore, a driver having a smaller capacity can be employed, which contributes to a reduction of the manufacturing cost, and the electric discharge between the charging electrodes can be prevented. Further, since an electric charge identical in polarity with the toner can be given to the non-image region, the non-image region scarcely becomes foggy.

What is claimed is:

1. A multi-stylus electrode assembly for use in electrostatic recording, said assembly including a body having a face to be directed toward a recording paper, a plurality of charging electrodes arranged in a line along said face and a plurality of auxiliary electrodes disposed on either side of said charging electrodes, the improvement comprising an insulating material covering said auxiliary electrodes which provides a gap holding and insulating function wherein said insulating material maintains said charging electrodes apart from said recording paper.

2. An electrode assembly as claimed in claim 1, wherein said insulating material has a volumetric resistivity of at least approximately $10^{10}$ $\Omega$cm.

3. An electrode assembly as claimed in claim 1, wherein said insulating material is between approximately 2 $\mu$m and 20 $\mu$m in thickness.

4. An electrode assembly as claimed in claim 1, wherein said insulating material is an insulating paint.

5. An electrode assembly as claimed in claim 1, wherein said insulating material is a polyfluorethylene paint.

6. A method of electrostatic record image forming of the type including steps of passing a multi-stylus electrode assembly having charging electrodes and auxiliary electrodes over a surface of an electrostatic recording medium during relative movement of one of said assembly and medium, and generating a potential difference between selected charging electrodes and corresponding auxiliary electrodes to record an electrostatic latent image on said recording medium, the improvement characterized in that said passing step comprises passing a multi-stylus electrode assembly having its auxiliary electrodes covered with an insulating material over said surface of said recording medium such that said insulating material contacts said surface, said insulating material providing a gap holding and insulating function wherein said insulating material maintains said charging electrodes apart from said recording medium.

7. The method as claimed in claim 6, wherein said insulating material has a volumetric resistivity of at least approximately $10^{10}$ $\Omega$cm.

8. The method as claimed in claim 6, wherein the thickness of said insulating material is between approximately 2 $\mu$m and 20 $\mu$m.

9. The method as claimed in claim 6, further comprising the step of electrically precharging said recording medium to a precharge potential at a point prior to said electrode assembly.

10. The method as claimed in claim 9, wherein said precharging step comprises precharging said recording medium to a first polarity and said generating step includes the step of applying a potential to said charging electrodes which is of opposite polarity to said first polarity.

11. The method as claimed in claim 9, wherein said generating step comprises applying a first potential to said charging electrodes and a second potential to said auxiliary electrodes and said precharge potential is between said first and second potentials.

* * * * *